United States Patent
Capriotti (12)

(10) Patent No.: US 6,483,911 B1
(45) Date of Patent: *Nov. 19, 2002

(54) METHODS AND APPARATUS FOR PROVIDING EXTERNAL ACCESS TO EXECUTABLE CALL FLOWS OF A NETWORK APPLICATION

(75) Inventor: Steven J. Capriotti, Collegeville, PA (US)

(73) Assignee: Unisys Corporation, Blue Bell, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,744

(22) Filed: Nov. 5, 1997

(51) Int. Cl.[7] .................................................. H04M 3/42
(52) U.S. Cl. ............................ 379/201.03; 379/201.01; 379/201.02; 379/201.04; 379/201.05
(58) Field of Search ............................... 379/67.1, 90.01, 379/93.05, 201, 219, 220, 265, 266, 88.13, 88.17, 88.18, 900, 201.02, 201.03, 201.05

(56) References Cited

U.S. PATENT DOCUMENTS

| 4,785,408 | A | | 11/1988 | Britton et al. ............ 364/513.5 |
| 5,323,452 | A | | 6/1994 | Dickman et al. ............ 379/201 |
| 5,329,578 | A | * | 7/1994 | Brennan et al. ........ 379/211.03 |
| 5,355,406 | A | | 10/1994 | Chencinski et al. ........... 379/88 |
| 5,384,829 | A | * | 1/1995 | Heileman, Jr. et al. .. 379/88.26 |
| 5,463,682 | A | | 10/1995 | Fisher et al. ................. 379/201 |
| 5,511,116 | A | * | 4/1996 | Shastry et al. .......... 379/201.03 |
| 5,555,288 | A | | 9/1996 | Wilson et al. .................. 379/67 |
| 5,633,916 | A | * | 5/1997 | Goldhagen et al. ......... 379/67.1 |
| 5,642,410 | A | | 6/1997 | Walsh et al. ................. 379/201 |
| 5,724,406 | A | * | 3/1998 | Juster ....................... 379/88.17 |
| 5,754,636 | A | * | 5/1998 | Bayless et al. ........... 379/142.1 |
| 5,793,966 | A | * | 8/1998 | Amstein et al. ............. 709/203 |
| 6,031,836 | A | * | 2/2000 | Haserodt .................... 370/389 |

* cited by examiner

*Primary Examiner*—Ahmad F. Matar
*Assistant Examiner*—Bing Bui
(74) *Attorney, Agent, or Firm*—Woodcock Washburn; Lise A. Rode; Mark T. Starr

(57) ABSTRACT

In a computer system that has an interface to a telephone network and that executes network applications comprising one or more call flows that provide telephony services to callers who access the computer system via the telephone network, a call flow library provides an interface between the network applications and a client application to enable the client application to externally call and initiate execution of a selected call flow of one of the network applications.

16 Claims, 5 Drawing Sheets

METHODS AND APPARATUS FOR PROVIDING EXTERNAL ACCESS TO EXECUTABLE CALL FLOWS OF A NETWORK APPLICATION

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to systems, such as voice messaging systems, in which call flows of a network application are executed to provide telephony-related services, such as Call Answer, Call Forward, Voice Store and Forward, Voice Mail, Bank By Phone, Emergency Number Facilities, Directory Assistance, Operator Assistance, Call Screening, Automatic Wake-up Services, and the like. More particularly, the present invention is directed to methods and apparatus for providing external program access to the executable call flows of a network application.

2. Description of the Prior Art

U.S. Pat. No. 5,133,004, issued Jul. 21, 1992 and assigned to the assignee of the present invention, describes a Network Applications Platform commercially available from UNISYS Corporation ("the NAP system"). The NAP system is a configuration of hardware and software that provides data and voice processing capabilities through applications running on an enterprise server. The NAP system provides the interface between these applications, called network applications, and a telephone network. Network applications running on the NAP system can provide enhanced services for telephone networks, such as Call Answer, Call Forward, Voice Store and Forward, Voice Mail, Bank By Phone, Emergency Number Facilities, Directory Assistance, Operator Assistance, Call Screening, Automatic Wake-up Services, and the like. The NAP can be implemented on UNISYS A Series and ClearPath HMP computer systems running the MCP operating system. Further details of the structure and function of the NAP are provided in U.S. Pat. No. 5,133,004, which is hereby incorporated by reference in its entirety.

A network application is an application program that executes on a telephony-based system, such as the NAP system, to provide telephony-related services, such as Call Answer, Call Forward, Voice Store and Forward, Voice Mail, Bank By Phone, Emergency Number Facilities, Directory Assistance, Operator Assistance, Call Screening, Automatic Wake-up Services, and the like. A network application comprises one or more call flows which determine the functionality of the application. A call flow defines how a call is processed from the time it is connected until it is disconnected. It determines how a network application will react to various telephony-related events. In particular, a call flow specifies each function or processing step to be executed during a telephone call, the possible results for each function, the decision path to be followed based on the result, and each prompt or voice message to be played during the course of the telephone call. A call flow is comprised of a sequence of call states. As used herein, the phrase "to play a prompt" and variations thereof means to output the digitized voice of a prompt over a telephone connection or the like so that it can be heard by a caller. A call state is one state, or point, in a call flow. At any given time, each call coming into a network application has a finite call state. At a given call state, a given function is performed and the results of the function point either to a next state, or to an exit state. The function can lead to one or many results.

FIG. 1 illustrates the call flows of an exemplary network application that can be executed on the UNISYS NAP system. In the example shown, the network application comprises two call flows—CALLFLOW1 and CALLFLOW2. CALLFLOW1 might, for example, provide voice mail services, while CALLFLOW2 might provide automated call answering services. Each box 10–26 in FIG. 1 represents one call state.

On the NAP system, a network application developer can specify different call types to be handled by a network application. Each call type can be serviced by a different call flow and has a unique identifier associated with it. An Incoming Call (INCMG) state 12 is the first call state in every network application. The INCMG call state 12 identifies the type of call received by the NAP system and routes that call to the appropriate call flow of the application. In the example of FIG. 1, a first call type is routed to the voice mail call flow which has a call flow identifier of "001," whereas a second call type is routed to the call answering call flow which has a call flow identifier of "002." The different call types must be specified in the network application, and they must also be defined to the NAP system when the network application is installed and initialized on the system. Once the different call types have been defined, the NAP system is able to identify the different call types and to return the appropriate call flow identifier in the INCMG call state 12 when a call is received, so that the call can be processed by the appropriate call flow. Each call processed by the NAP system is referred to as a dialog.

At each subsequent call state in a call flow, some function is performed. On the NAP system, a call flow can execute two kinds of function—core functions and custom functions. Core functions are pre-coded functions provided with the NAP system. These functions provide basic telephony services such as initiating a call, playing a voice prompt, collecting digits, and the like. Custom functions are application-specific functions that the application developer creates to perform functions not available using the core functions. For example, the application may require the retrieval of information from an application-specific database. Custom functions can be written in any programming language that the underlying computer system (e.g. UNISYS A Series or ClearPath HMP) on which the NAP system is implemented can execute, such as, for example, LINC, ALGOL, COBOL, C or the like.

Referring to the example of FIG. 1, the voice mail call flow (CALLFLOW1) proceeds to call state 14, at which the Play Prompt (PROMPT) core function is executed to play prompt number "P1000" to the caller. This prompt might, for example, play the following voice: "You have <number> new messages—Press 1 to review, Press 2 for other options." Based on the user's selection, the call flow will then pass to a next state at which another function will be performed. Ultimately, the dialog established for this call will end at call state 16 which performs the Terminate Dialog core function.

When a call of type "002" is received, the call will be routed to CALLFLOW2. At call state 18, this call flow might prompt the caller to "Press 1 to hear prompts in English, Press 2 to hear prompts in Spanish, or Press 3 to hear prompts in French." This time the Play Prompt core function (PROMPT) is combined with a Collect Digits function so that the NAP system will accept a caller's response. If the caller presses "1", the call flow will move to call state 20 where a Set Language core function is performed to set the active language to American English. If the caller presses "2," the call flow moves to call state 22 where the Set Language core function is performed to set the active language to American English. If no key is pressed, or an invalid key is pressed, the call flow defaults to step 24 which establishes the American English language as the default. The remainder of the call flow then proceeds until the dialog established for the call terminates at call state 26. As the foregoing illustrates, the INCMG call state, in combination with defined call types, can be used to handle different types of calls within a single network application.

On the NAP system, network applications are created using two personal computer (PC) based applications—PC SPIN and PC NAPTool. PC SPIN is a modified form of the SPIN program described in commonly assigned U.S. Pat. No. 5,493,606, and is used by an application developer to create and modify sets of prompt definitions and related information required to expand and play prompts on the system. PC NAPTool is used by a network application developer to create and edit the call flows of a network application. The PC SPIN and PC NAPTool programs run in the Microsoft Windows environment. Further details concerning the use of the PC SPIN and PC NAPTool programs to create a network application are provided in U.S. Pat. No. 5,493,606 and in co-pending application Ser. No. 08/944,924, filed Oct. 6, 1997, entitled "Enhanced Multi-Lingual Prompt Management In A Voice Messaging System With Support For Speech Recognition," both of which are hereby incorporated by reference in their entireties.

Once created, the files and information comprising a network application are transferred from the PC environment to the NAP system. An Installation Manager program takes the transferred information and installs it in appropriate files on the host computer of the NAP system (e.g., UNISYS A Series or ClearPath HMP computer) for use during execution of the network application. In particular, a representation of each call flow of the network application is stored in a CALLFLOWS file. This file specifies the functions to be performed at each call state and the logic that controls the flow of execution from state-to-state. An INSPARAM file contains certain installation parameters associated with the network application. A COREDEF file provides certain default input parameters for certain core functions, particularly those that may require site-specific changes, and a CUSTATTR file contains attributes of all custom functions written for the network application.

A network application executes in a runtime environment on the NAP system. Multiple network applications can be installed and run on a single NAP platform, with each network application running in its own runtime environment. The runtime environment for a given network application includes a core function library (part of the agent) that contains the executable code for each core function, and a custom function library that contains the executable code for each custom function written for the network application. Another interface (not shown) exists to provide access to custom functions written in the LINC programming language.

A primary component of the runtime environment is called the agent. The agent is a software component that (i) performs and controls call flow execution (the next function to be executed is based on the result of the previous function), (ii) passes parameters to various functions, (iii) translates new dialog activity into call states, (iv) saves information from NAP responses for use during call flow execution, and (v) enters call flow information into memory-based state tables. Execution of a call flow by the agent is interpretive; the agent interprets the representation of the call flow contained in the CALLFLOWS file. At each call state, the agent invokes the specified core function or custom function from the appropriate library.

It would be desirable if the call flows of a network application could be called externally from another application program. That other application program could be another network application running in its own environment on the host system or some other non-telephony based application running on the host computer (outside of the NAP environment) or on another computer. For example, the developer of a database application for use by mortgage lenders that identifies delinquent mortgage payments might want to provide the ability to automatically call the delinquent borrower and play a voice prompt reminding the borrower of the delinquent payment. An installed network application may already have a call flow that provides this functionality, and therefore, it would be desirable for the database application developer to be able to make an external call to that call flow, rather than developing new code to perform the same function. Accordingly, there is a need for methods and apparatus for providing external program access to the executable call flows of a network application. The present invention satisfies this need.

SUMMARY OF THE INVENTION

The present invention is directed to methods and apparatus for providing external program access to the executable call flows of a network application. More specifically, in a computer system that has an interface to a telephone network and that executes network applications that provide telephony services to callers over the network, the present invention provides an interface between one or more network applications and a client application to enable the client application to externally call and initiate execution of a selected call flow of one of the network applications. This is a powerful tool that enables developer's of client applications to take advantage of existing telephony-related functionality provided by one or more network applications, avoiding the need to reinvent or reproduce complicated telephony code in the client application. Additionally, the present invention allows new network applications to take advantage of the call flows of other, existing network applications. The present invention thus provides a unique form of code reuse that results in a tremendous savings of time and effort during application development.

According to a preferred embodiment, the methods and apparatus of the present invention are embodied in a call flow library that comprises a set of procedures that enable a client application to call and initiate execution of a selected call flow of a selected network application. Each network application establishes a link to the call flow library, and each linkage has a unique connection index associated therewith. A routing table, which is part of the call flow library, contains an entry for each network application that specifies a name associated with the network application and the connection index associated with its linkage to the call flow library. Each entry in the routing table is identified by a slot number (SLOT #). A client application that wants to execute a particular call flow of a selected network application calls a first procedure (GETLIBINX) of the call flow library that contains programmed instructions that cause the computer system to access the routing table and to return to the client application an indication of the connection index associated with the link between the call flow library and the selected network application. Specifically, in the preferred embodiment, the first procedure uses the name associated with the selected network application to access the routing table and to return the SLOT # of the entry in the routing table for that network application. The SLOT # serves as an indication of the connection index for the selected network application, since it can then be used to retrieve the connection index from the routing table entry that it identifies. Alternatively, the first procedure could return the connection index directly.

The client application then calls a second procedure (CALLFLOW_INTERFACE) that contains programmed instructions for causing the computer system to initiate, via the linkage identified by the connection index indicated by the first procedure, execution of a selected call flow of the selected network application. An identifier of the selected call flow and information needed to initialize the selected call flow for proper execution are passed to the selected network application as input parameters of the second procedure. The call flow library may further comprise a third procedure (REGISTER_APP) that is called by a network application upon initialization of that network application on the computer system. This third procedure contains programmed instructions that cause the computer system to establish a link between the network application and the call flow library and to store, in an entry (identified by a particular SLOT #) in the routing table, a connection index associated with that link. The third procedure also stores in that entry a name(s) associated with the network application.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

The present invention is directed to methods and apparatus for providing external program access to the executable call flows of a network application. More specifically, in a computer system that has an interface to a telephone network and that executes network applications that provide telephony services to callers over the network, the present invention provides an interface between one or more network applications and a client application to enable the client application to externally call and initiate execution of a selected call flow of one of the network applications. The methods and apparatus of the present may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 1:
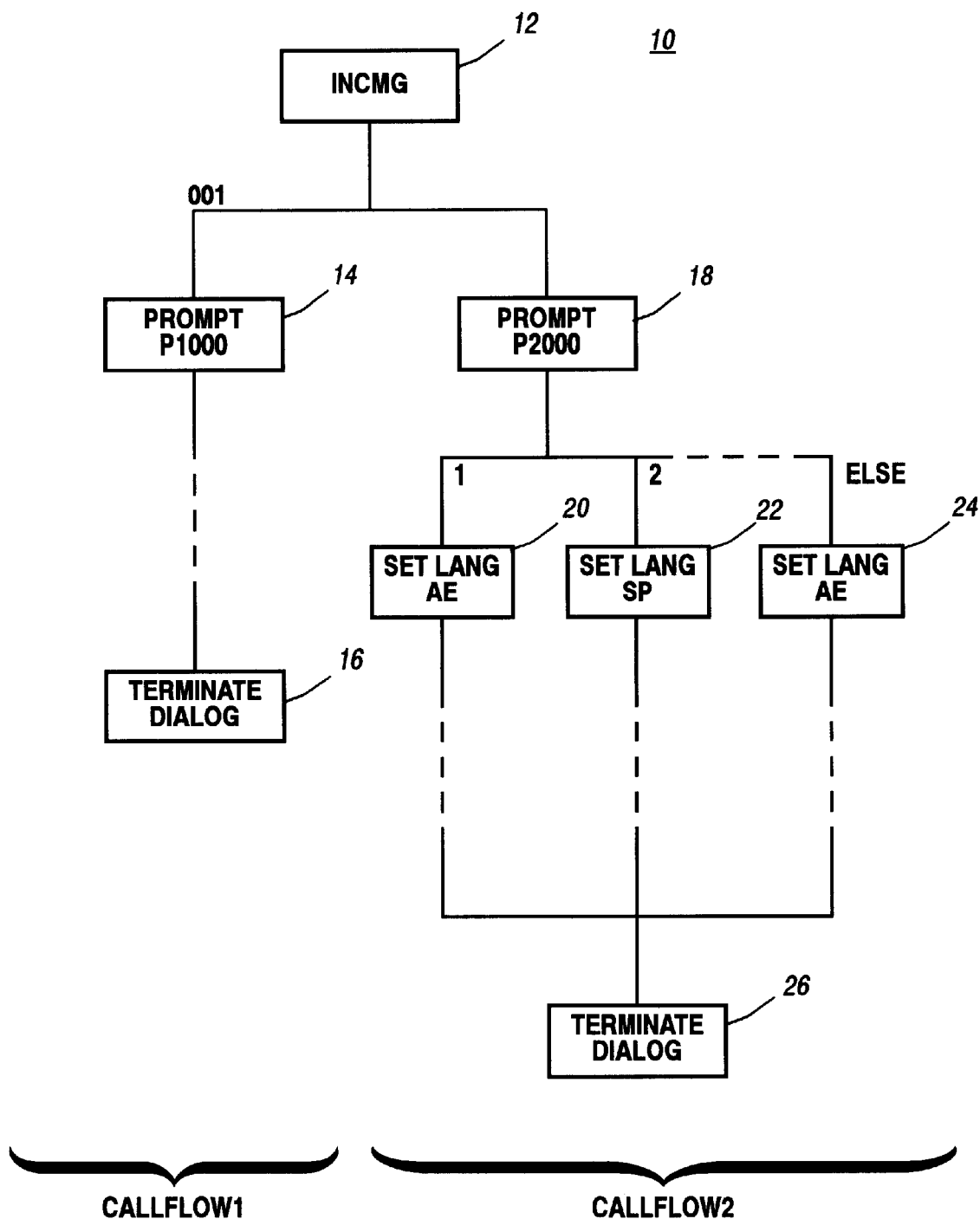
FIG. 1 shows the call flows of an exemplary network application that can be installed and executed on a NAP system.
Figure 2:
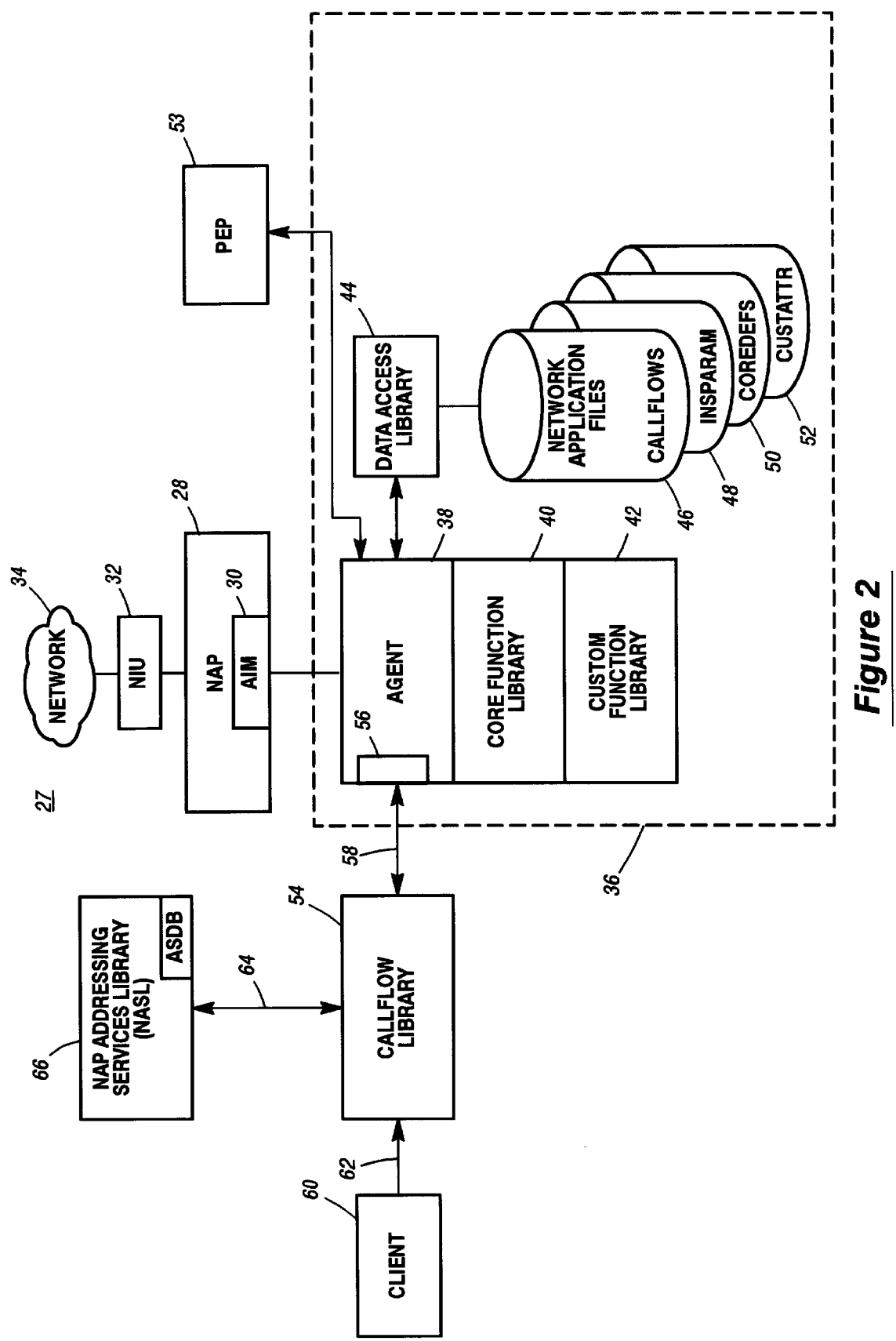
FIG. 2 is a block diagram illustrating an exemplary computer system in which the present invention may be embodied and illustrating a preferred embodiment the present invention.

Referring to the drawings, wherein like numerals represent like elements throughout, FIG. 2 is a block diagram illustrating an exemplary computer system 27 in which the present invention may be embodied and illustrating a preferred embodiment of the methods and apparatus of the present invention. In the present embodiment, the computer system 27 is of a type that employs the UNISYS MCP operating system, such as, for example, a UNISYS A Series computer system or a UNISYS ClearPath HMP computer system. Of course, the present invention is by no means limited to implementation on these computer systems, nor computer systems that employ the MCP operating system. Any computer system capable of implementing the features of the present invention, as defined by the appended claims, can be employed.

As shown in FIG. 2, the computer system 27 comprises an interface to a telephone network 34 that enables the computer system to execute network applications to provide telephony services to callers. In the present embodiment, the interface comprises a Network Applications Platform ("NAP system") 28 commercially available from UNISYS corporation. The NAP 28 physically interfaces with the telephone network via a Network Interface Unit (NIU) 32. Network applications communicate with the NAP 28 via an Application Interface Module (AIM) 30, which is the central communication module of the NAP 28. A Prompt-Expansion-Processor (PEP) 53 performs the expansion of voice prompts during execution of a network application. The NAP 28 also provides an Addressing Service 66. The Addressing Service 66 is a network-wide directory used to determine the location and existence of mailboxes within a voice mail network. Further details of the NAP 28, NIU 32, AIM 30, and PEP 53 are described in said U.S. Pat. Nos. 5,133,004 and 5,493,606, and in said co-pending application Ser. No. 08/944,924, all of which are incorporated herein by reference in their entireties.

A network application is installed on the computer system 27 in its own runtime environment 36. The runtime environment 36 of the network application comprises an agent 38, a set of files that define the functionality of the network application, including a CALLFLOWS file 46, an INSPARAM file 48, a COREDEF file 50, and a CUSTATTR file 52, a data access library through which the agent 44 accesses the files 46–52, a core function library 40 and a custom function library 42. The core function library 40 contains the executable code for each core function, and the custom function library 42 contains the executable code for each custom function written for the network application. The CALLFLOWS file 46 contains the network application call flows. For each call flow, this file specifies the functions to be performed at each call state and the logic that controls the flow of execution from state-to-state. The INSPARAM file 48 contains certain installation parameters associated with the network application. The COREDEF file 50 provides certain default input parameters for certain core functions, particularly those that may require site-specific changes, and the CUSTATTR file 52 contains attributes of all custom functions written for the network application. Another interface (not shown) may be provided for access to custom functions written in the LINC programming language.

The agent 38 is the primary component of the runtime environment of the network application. Among other things, the agent 38 performs and controls call flow execution (the next function to be executed is based on the result of the previous function), passes parameters to various core and custom functions, translates new dialog activity into call states, saves information from NAP responses for use during call flow execution, and enters call flow information into memory-based state tables. Execution of a call flow by the agent 38 is interpretive; the agent interprets the representation of the call flow in the CALLFLOWS file 46. At each call state, the agent 38 invokes the specified core function or custom function from the appropriate library 40, 42.

According to the present invention, a call flow library 54 provides an interface between one or more network applications, such as network application 36, and a client application 60 to enable the client application 60 to externally call and initiate execution of a selected call flow of one of the network applications. Each network application and the client application link to the call flow library 54. For example, the client application 60 links to the call flow library 54 via a connection 62, and the network application 36 links to the call flow library 54 via a connection 58. In the present embodiment, a portion of the call flow library 54 functionality is embodied in a portion 56 of the program code of the agent 38, as described hereinafter.

Figure 3:
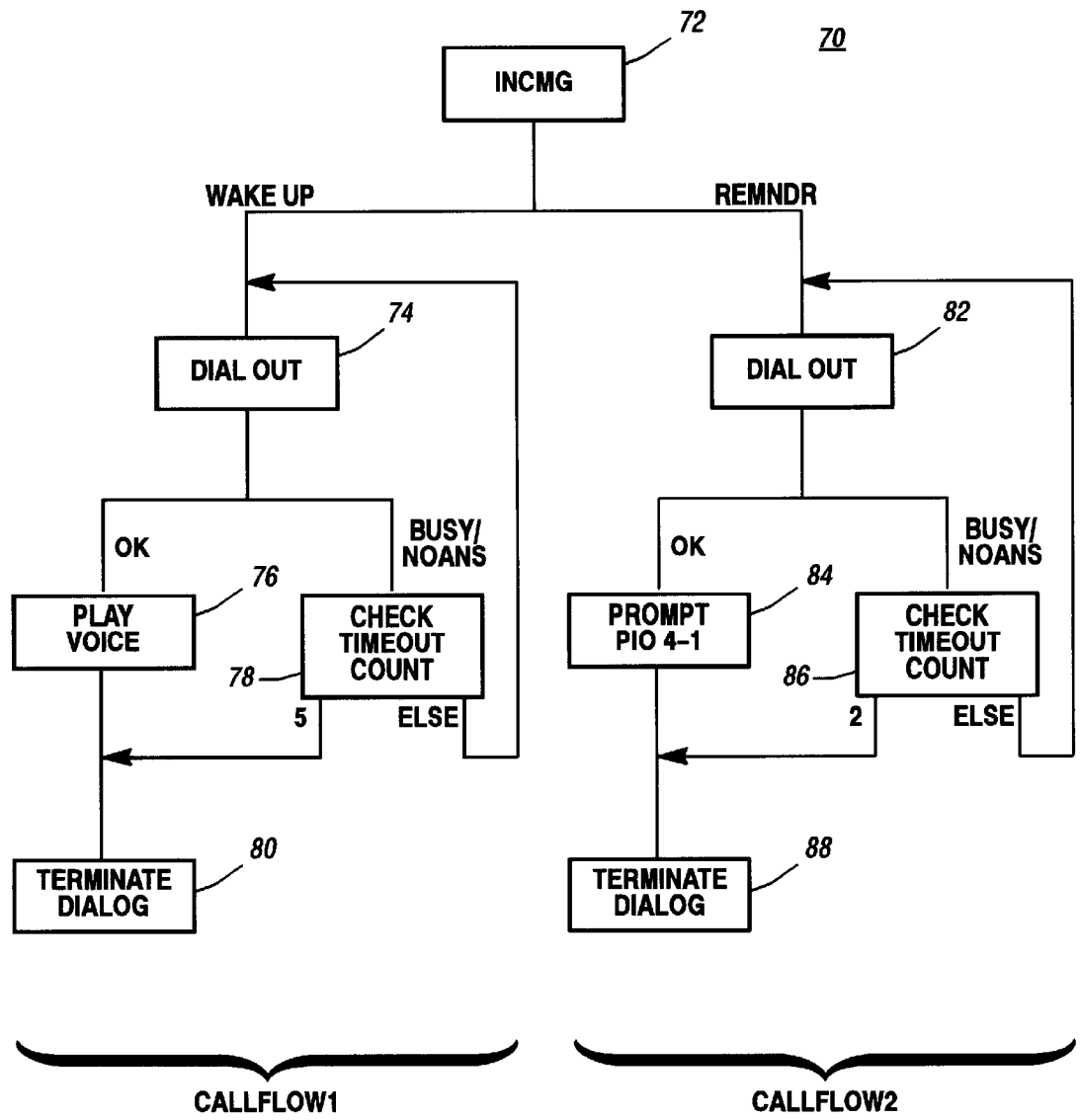
FIG. 3 shows the call flows of another exemplary network application to which one or more client applications may wish to have external access in accordance with the present invention.

For purposes of illustration hereinafter, FIG. 3 illustrates an exemplary network application 70 containing two call flows that a client application may wish to execute to perform certain telephony services. A first call flow (CALLFLOW1) provides an automated wake-up service and has a call flow identifier ="WAKEUP." The second call flow (CALLFLOW2) provides an automated reminder service and has a call flow identifier "REMNDR." The call flow identifier is used at the INCMG state to determine which of a plurality of call flows is to be executed based on a received call type.

As an example of a use for the present invention, a client application that provides a hotel registration database might also be programmed to handle wake-up call requests. Rather than provide code to perform the wake-up call functionality within the client application, the client application could take advantage of the WAKEUP call flow of the exemplary network application 70 which may already be installed on an existing NAP system that the hotel uses to provide voice messaging services for hotel guests. For a hotel guest that requests a wake-up call at a particular time, the client application could maintain a database entry for that guest that specifies the wake-up time and the guest's room phone number. At the requested time, the client application could use the call flow library 54 of the present invention to initiate execution of the WAKEUP call flow of the network application 70 installed and running on the hotel's voice messaging system.

At call state 74, the WAKEUP call flow performs a DIAL OUT function to establish a telephone connection using the phone number of the guest who requested the wake-up call. If the call is answered, control passes to call state 76 where a Play Voice function is executed to play a pre-recorded wake-up message to the guest. Once completed, the call is terminated at step 80 using the Terminate Dialog function. If the call results in a busy or no answer condition, then the call flow will increment a time-out variable at step 78 and pass control back to call state 74 to attempt the Dial Out function again. After five unsuccessful attempts to Dial Out, the call flow will terminate at step 80. The client application can then try again at a later time.

As another example of a client application that can benefit from the present invention, consider a bank that has a database application that keeps a database of all customers who have outstanding loans with bank. The bank may wish to add a feature to the database application that would provide an automated reminder service for customers whose loan payments are delinquent. Again, rather than develop new code in the database application to perform this functionality, the client application could take advantage of the REMNDR call flow of the exemplary network application 70 which may already be installed on a NAP system that the bank uses to provide bank-by-phone services to its customers. Any time the database application detects that a customer's loan payments are delinquent, the application could make an external call to the REMNDR call flow, passing the customer's home phone number to the call flow. At step 82, the call flow will perform a Dial Out function using the customer's phone number to initiate a telephone call to the customer. If answered, control will pass to step 84 where a prompt is played to inform the customer that a payment is delinquent. Using dynamic data, the prompt may also indicate the amount of the delinquent payment, the date that it was due, and the outstanding balance on the loan. The call will then terminate at step 88. If the attempt to establish a call results in a busy or no answer condition, then control will pass to step 82 where a time-out count is incremented. Control will then pass back to call state 82 to perform the Dial Out function again. In this example, if the attempt to Dial Out is unsuccessful after two attempts, the call flow will terminate at step 88. The client application can then initiate the process again at a later time.

The foregoing are just two examples of how a non-telephony client application can take advantage of the call flow library 54 of the present invention to provide certain telephony services. Reference to these examples is made below to further explain certain features of the present invention. Although these examples involve non-telephony client applications, a client application could be another network application. In such a case, the client network application would employ a custom function to make an external call to another network application via the call flow library 54 of the present invention. A client does not have to reside on the same computer system on which the network application is installed. A remote procedure call to the call flow library 54 could be made from another computer system.

Figure 4:
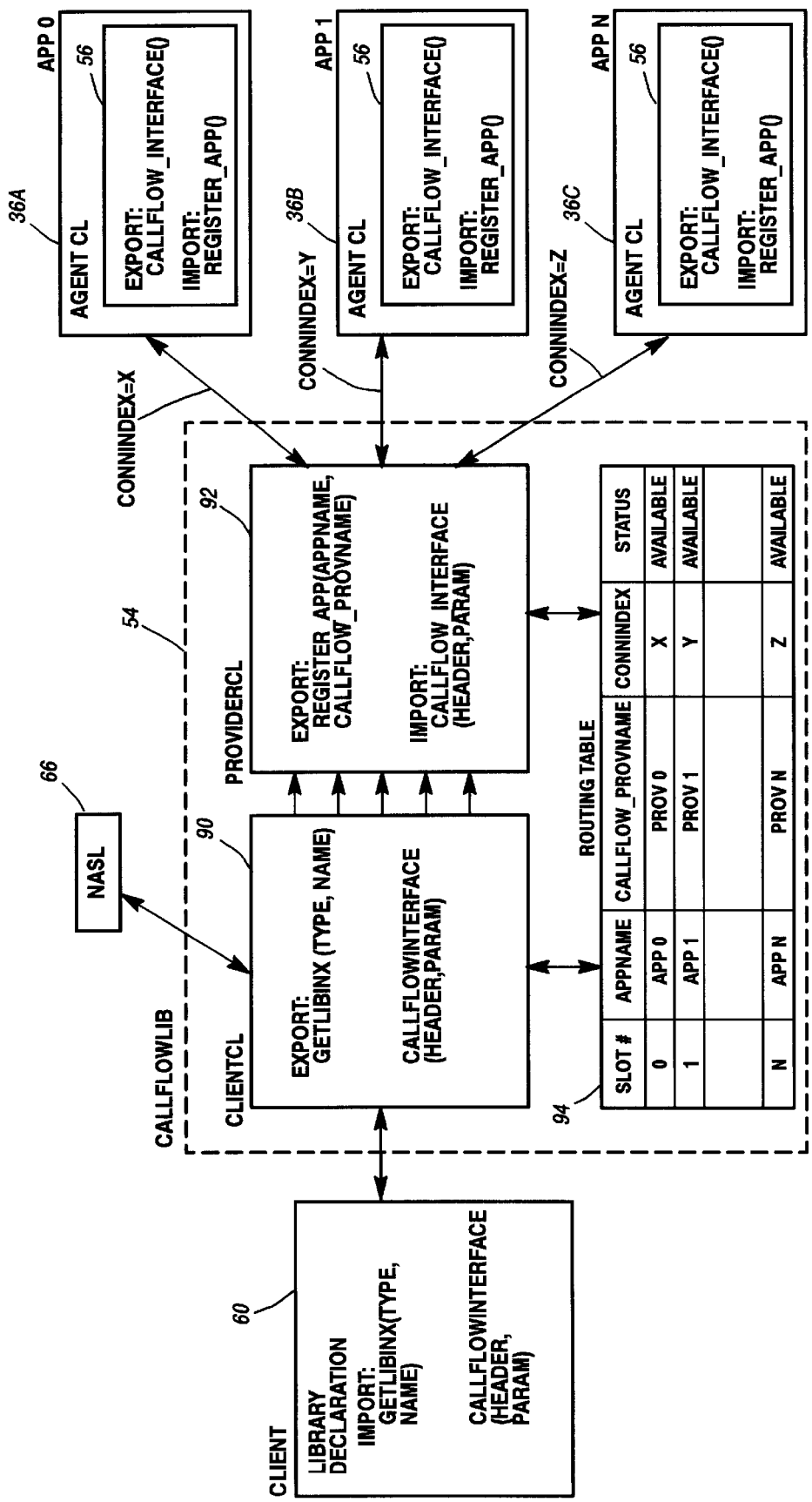
FIG. 4 is a block diagram providing further details of the preferred embodiment of the methods and apparatus of the present invention.

FIG. 4 shows further details of a preferred embodiment of the call flow library 54 of the present invention. As shown, multiple network applications 36A, 36B . . . 36N can be installed and running on the computer system 27. The call flow library 54 of the present invention comprises a set of procedures that enable a client application to call and initiate execution of a selected call flow of a selected network application. In the present embodiment, the call flow library 54 is implemented in the ALGOL programming language and utilizes the connection library capabilities of the MCP operating system. A connection library is a collection of objects (e.g., procedures) grouped together to be shared with another process or processes (e.g., application programs). Connection libraries provide the ability for a two-way exchange of objects between processes through a linkage called a connection. Linkages can exist between connection libraries, or between a connection library and a client program or application. When two connection libraries establish a connection, each library can export objects for use by the other library. Both libraries can execute in parallel. A connection library can also provide data structures to client processes. A single program can export more than one connection library simultaneously. A connection library is declared using a connection block declaration. The connection block is a type declaration that acts as a model for the definition of one or more connection libraries. Further details concerning connection libraries can be found in the UNISYS ClearPath HMP NX and A Series Task Management Programming Guide, available from UNISYS Corporation.

In accordance with the preferred embodiment of the present invention, the call flow 30 library 54 is embodied in a program, denoted CALLFLOWLIB, comprising two connection libraries 90 and 92, denoted "CLIENTCL" and "PROVIDERCL", respectively. Additionally, a portion of the call flow library functionality is embodied in a third connection library 56, denoted "AGENTCL," which is declared as part of the program code of each agent 36A, 36B . . . 36N. Each of these connection libraries is declared using a respective connection block type declaration.

The CLIENTCL connection library 90 exports a procedure named GETLIBINX( ) and a procedure named CALLFLOW_INTERFACE( ). A client application 60 that is linked to the CLIENTCL connection library 90 of the call flow library 54 can import these two procedures. The PROVIDERCL connection library 92 exports a procedure named REGISTER_APP( ) and imports a procedure named CALLFLOW_INTERFACE( ) from the AGENTCL connection library 56 of a network application agent 36A, 36B . . . 36N. The AGENTCL connection library 56 imports the REGISTER_APP( ) procedure of the PROVIDERCL connection library 92, and exports its CALLFLOW_INTERFACE( ) procedure (which the PROVIDERCL connection library 92 imports). While the CALLFLOW_INTERFACE( ) procedure of the AGENTCL connection library 56 in each agent has the same name as the CALLFLOW_INTERFACE( ) procedure in the CLIENTCL connection library 90, it is understood that they are different procedures. To avoid confusion, the CALLFLOW_INTERFACE( ) procedure of the CLIENTCL connection library 92 will be referred to hereinafter as CLIENTCL.CALLFLOW_INTERFACE( ), whereas the CALLFLOW_INTERFACE( ) exported by the AGENTCL connection library 56 will be referred to hereinafter as AGENTCL.CALLFLOW_INTERFACE( ).

When a network application is installed and initialized on the NAP system, an application name is assigned to the application using a NAP administration facility. For network applications that are intended to be call flow providers (i.e., accessible by external programs using the call flow library 54 of the present invention), the application developer can also assign a call flow provider name. The application name and call flow provider name of a network application are stored in its INSPARAM file.

During initialization of a network application, the NAP system initiates an agent 36 for the network application. The agent 36 reads the INSPARAM file to obtain certain installation information for the network application. The presence of a service provider name in the INSPARAM file indicates to the agent 36 that the network application is to serve as a call flow provider and must therefore be linked to the call flow library 54. In the present embodiment, the agent 36 executes a LINKLIBRARY function of the MCP operating system to link, in particular, to a private instance of the PROVIDERCL connection library of the call flow library 54. This instruction has the following syntax:

LINKLIBRARY (CALLFLOWLIB, INTERFACENAME="PROVIDERCL")

where the INTERFACENAME parameter identifies the PROVIDERCL connection library 92 of the call flow library program 54 (CALLFLOWLIB). Successful execution of the LINKLIBRARY function establishes a linkage between the agent 36 of the network application and a private instance of the PROVIDERCL connection library 92 of the call flow library 54. Each network application links to its own private instance of the PROVIDERCL connection library 92 of the call flow library 54. The MCP operating system then invokes a change procedure in the instance of the PROVIDERCL connection library to which the network application is linked, and passes a unique connection index to the change procedure that identifies the linkage. The change procedure then stores the connection index as a variable local to that instance of the PROVIDERCL connection library. A change procedure is a user-written procedure that the MCP operating system calls in response to connection library linkages and delinkages.

Assuming that a successful linkage occurs, the agent 36 then calls the REGISTER_APP( ) procedure exported by the PROVIDERCL connection library 92. The REGISTER_APP( ) procedure validates the application and call flow provider names specified in the INSPARAM file. Assuming that validation is successful, the REGISTER_APP( ) procedure then creates an entry for the network application in a routing table 94 of the call flow library 54. Each entry of the routing table 94 contains a SLOT # field that provides the index into the routing table for the network application, an APPNAME field that holds the application name assigned to the network application, a CALLFLOW_PROVNAME field that holds the call flow provider name assigned to the network application, a CONNINDEX field that holds the connection index assigned to the linkage between the network application and its private instance of the PROVIDERCL connection library 92 of the call flow library 54, and a STATUS field that identifies whether the network application is available (i.e., installed and running on the NAP system).

The following is a pseudo-code listing for the REGISTER_APP( ) procedure:

REGISTER_APP (APPNAME, CALLFLOW_PROVNAME)

look up routing table slot number (SLOT #) for APPNAME and store as APP SLOT NUMBER(APP SLOT NUMBER will be a positive integer if the application already exists);

look up routing table slot number (SLOT #) for CALLFLOW_PROVNAME and store as PROV SLOT NUMBER (PROV SLOT NUMBER will be a positive integer if the provider already exists);
if APP SLOT NUMBER <0 and PROV SLOT NUMBER <0 then perform the following to register new application:
  add one to NUMAPPS(indicates total number of slots used in routing table);
  if size of routing table too small, then resize routing table;
  copy APPNAME and CALLFLOW_PROVNAME into the routing table at the slot number equivalent to the value of NUMAPPS=NEW SLOT NUMBER;
  store connection index (passed to PROVIDERCL change procedure by OS) in routing table at NEW SLOT NUMBER;
  set STATUS=AVAILABLE in routing table at NEW SLOT NUMBER to indicate application is registered;
else if APP SLOT NUMBER <0 and the PROV SLOT >0 then: return error;—duplicate CALLFLOW_PROVNAME
else if the APP SLOT NUMBER >0 and STATUS= AVAILABLE then: return error;—cannot overwrite/change registration when same APPNAME is already registered
else (re-use APP SLOT NUMBER):
  copy CALLFLOW_PROVNAME into routing table at re-used APP SLOT NUMBER;
  set STATUS=AVAILABLE in routing table at APP SLOT NUMBER to indicate application is registered;
  store connection index number in routing table at APP SLOT NUMBER;
END of procedure REGISTER_APP As the foregoing pseudo-code listing shows, two inputs are passed as parameters to the REGISTER_APP( ) procedure—APPNAME, which is the name assigned to the network application at installation, and CALLFLOW_PROVNAME, which is the call flow provider name assigned to the application. The procedure first uses each name as an index into the routing table to see if either name already appears in one of the SLOT # entries of the routing table. If neither name appears, there is no problem and the new network application can be registered by creating a new entry in the routing table at the next available slot (SLOT #=NUMAPPS+1). The APPNAME and CALLFLOW_PROVNAME of the network application are then stored in the appropriate fields of the routing table, along with the connection index associated with the linkage that was created using the LINKLIBRARY function (i.e., the value stored by the change procedure of this instance of the PROVIDERCL connection library). Finally, the STATUS field is changed to AVAILABLE to indicate that the network application call flows are available for execution via the call flow library 54.

If the CALLFLOW_PROVNAME of the new network application already appears in the routing table, then an error is returned indicating a duplicate name. Duplicate CALLFLOW_PROVNAMEs are not permitted. Similarly, if the APPNAME already appears in the routing table, and the STATUS field for the SLOT # containing that APPNAME indicates that the existing application is "AVAILABLE" (i.e., installed and running), then an error is also returned. The registration process cannot overwrite an already registered application that is "AVAILABLE." If, however, the APPNAME already appears in the routing table but its STATUS is not AVAILABLE, then the SLOT # in which that APPNAME appears can be re-used. Accordingly, the REGISTER_APP( ) procedure will store the CALLFLOW_PROVNAME and connection index in the appropriate fields of the SLOT # entry, and will then set the STATUS to AVAILABLE.

The use of a change procedure in connection with the connection library functionality of the MCP operating system provides a means to keep track of the linkages between network applications and the call flow library 54. For example, if a link is terminated as a result of some system fault, the operating system will call the change procedure in the instance of the PROVIDERCL connection library 92 for that link to inform the change procedure of the termination of the link. The change procedure code can then handle updating of the STATUS field of the appropriate routing table in accordance with the present invention. For example, the STATUS of the network application could be changed to "UNAVAILABLE."

As an alternative to the REGISTER_APP procedure, linkage and validation can be performed using the LINKLIBRARY function in combination with an approval procedure (not shown). An approval procedure is analogous to a change procedure in that it can be directly called by the MCP operating system in association with specific connection library functionality. In this case, an approval procedure can be written to handle validation of the network application and/or call flow provider names and to handle identification and storage of the connection index in the appropriate routing table entry, in a similar manner to that performed by the REGISTER_APP procedure described above.

Assuming that no errors were returned, the network application is now registered and its call flows are available to be called by an external program via the call flow library 54, as described hereinafter. A client application 60 that wants to be able to make external calls to a network application to initiate execution of a selected one of its call flows must also link to the call flow library 60. Specifically, a client application must link to the CLIENTCL connection library 90 of the call flow library 54. A preferred method for a client application 60 to establish a linkage to the call flow library 54 is to define its own connection block, importing the GETLIBINX( ) and CLIENTCL.CALLFLOW_INTERFACE( ) procedures, and then to execute the LINKLIBRARY function. The following ALGOL code listing can be used to perform these tasks in a client application:

TYPE CONNECTION BLOCK CLIENTCL
BEGIN
  BOOLEAN PROCEDURE GETLIBINX(TYPE, NAME);
  VALUE TYPE;
  REAL TYPE;
  EBCDIC ARRAY NAME[0];
  IMPORTED:
  REAL PROCEDURE CALLFLOW_INTERFACE (HEADER,PARAMS);
  ARRAY HEADER[0];
  EBCDIC ARRAY PARAM[0];
  IMPORTED;
END OF CONNECTION BLOCK CLIENTCL;
CLIENTCL SINGLE LIBRARY CALLFLOWCL
  (INTERFACENAME="CALLFLIB.",
LIBACCESS=BYFUNCTION, FUNCTIONAME= "CALLFLOWLIB.");
  LINKLIBRARY(CALLFLOWCL);

Alternatively, for a client application written in a computer language that does not support connection libraries, such as, for example, COBOL, a standard MCP operating system server library interface can be used to enable a client application to invoke the functionality of the GETLIBINX( ) and CLIENTCL.CALLFLOW_INTERFACE( ) procedures.

A client application uses the GETLIBINX( ) and CLIENTCL.CALLFLOW_INTERFACE( ) procedures to initiate execution of a selected call flow of a selected network application. The GETLIBINX( ) is used to locate the routing table entry (SLOT #) of a network application to which the client application wishes to access, so that the connection index associated with its linkage to the call flow library 54 can be obtained. Specifically, the CLIENTCL.CALLFLOW_INTERFACE( ) procedure uses the SLOT # to obtain the connection index from the routing table 94. Thus, by providing the SLOT # of the routing table entry for a given network application, the GETLIBINX( ) procedure indirectly provides its connection index. In other embodiments, the connection index could be returned directly by the GETLIBINX( ) procedure. As used herein and in the claims, the phrase "return ... an indication of [a] connection index" is meant to encompass both methods.

After determining the connection index for the selected network application, the CLIENTCL.CALLFLOW_INTERFACE( ) procedure then initiates, via the linkage identified by the connection index, execution of the selected call flow. Specifically, the CLIENTCL.CALLFLOW_INTERFACE( ) procedure calls the AGENTCL.CALLFLOW_INTERFACE procedure imported by the PROVIDERCL connection library 92. Parameters passed to the selected network application by the AGENTCL.CALLFLOW_INTERFACE( ) procedure identify the selected call flow by its call flow identifier (i.e., the identifier normally used by the INCMG call state to route different incoming call types to different call flows), and provide initialization data needed for execution of the selected call flow.

In the present embodiment, the GETLIBINX ( ) procedure provides three different ways to identify a network application for the purpose of obtaining its SLOT # in the routing table 94. A first way is to provide the application name (APPNAME) assigned to the network application at installation. A second way is to provide the call flow provider name (CALLFLOW_PROVNAME) assigned to the network application. A third way can be used for those network applications that use the NAP Addressing Service 66 to maintain a database of subscribers to the service provided by the network application, such as, for example, a voice mail service. Such subscribers are each identified in the NAP Addressing Service Database (ASDB) by a MAILBOX NUMBER and a NUMBERING PLAN. The MAILBOX NUMBER and NUMBERING PLAN of a subscriber can be used as an index into the ASDB to identify the name (either an application name assigned at installation or a call flow provider name) associated with the network application that provides services to that subscriber. The following is a pseudo-code listing of the GETLIBINX( ) procedure:

GETLIBINX (TYPE, NAME)
If TYPE=1 (application name) then:
  search routing table for application name that matches NAME;
  if NAME matches then:
    return routing table SLOT # that contains the matching application name;
  else
  if input NAME was not formatted properly then:
    place entry in system log indicating improper input application name formatting;
    return error—indicating improper input application name formatting;
  else
    place entry in system log indicating no match was found for input NAME;
    return error—indicating no match was found for input application name;
else
if TYPE=0 (call flow provider name) then:
  search routing table for provider name that matches input NAME;
  if NAME matches then:
    return routing table SLOT # that contains the matching provider name;
  else
  if input NAME was not formatted properly then:
    place entry in system log indicating improper input provider name formatting;
    return error—indicating improper input provider name formatting;
  else
    place entry in system log indicating no match was found for input NAME;
    return error—indicating no match was found for input provider name;
else
if TYPE=2 (subscriber number) then:
  segregate NAME into subcomponents: MAILBOX NUMBER, and NUMBERING PLAN;
  look up application name using MAILBOX NUMBER and NUMBERING PLAN in the NAP addressing service database (ASDB);
  if a corresponding application name is not found then:
    place entry in system log indicating that the subscriber number was not found in the ASDB;
    return error—indicating no match was found for input subscriber name;
  else
    search routing table for application name that matches name returned from ASDB;
    if found match then:
      return routing table SLOT # that contains the matching application name;
    else
      search routing table for call flow provider name that matches name returned from ASDB;
      if found match then:
        return routing table SLOT # that contains the matching provider name;
      else
        place entry in system log indicating no match was found for input subscriber name;
        return error—indicating no match was found for input subscriber name;
else
  return error—indicating improper input routing type specified.
END of procedure GETLIBINX.

Input parameters to the GETLIBINX( ) procedure are TYPE and NAME. TYPE is used to specify which of the three methods for obtaining a SLOT # is to be used. In the present embodiment, a TYPE=0 indicates that the SLOT # will be obtained using the a call flow provider name (CALLFLOW_PROVNAME), a TYPE=1 indicates that the SLOT # will be obtained using the application name (APPNAME), and a TYPE=2 indicates that the connection index will be obtained using a subscriber number (MAILBOX NUMER and NUMBERING PLAN) as an index into the NAP Addressing Service 66. The NAME parameter is used to specify the identifying name to use in accordance with the specified TYPE.

When the application name associated with a network application is known, a client application can determine the SLOT # of its entry in the routing table by calling the GETLIBINX( ) procedure, with the TYPE parameter set to "1," and the NAME parameter containing the application name (APPNAME) of the network application. The GETLIBINX( ) procedure then searches the routing table for an APPNAME field that matches the application name passed as the NAME parameter. If a match is found, the procedure returns the SLOT # of the routing table entry containing the specified application name. If no match is found, the procedure checks to make sure that the application name was provided in the proper format. If not, an error is returned indicating the improper application name format. The error is also recorded in a system log. If no formatting error is detected, then an error is returned and entered in the system log indicating that no match was found in the routing table for the specified application name. As the pseudo-code listing shows, the same process is carried out when a call flow provider name is used to locate the SLOT # of a network application (TYPE=0, NAME=call flow provider name).

When a subscriber number (i.e., MAILBOX NUMBER and NUMBERING PLAN) of a subscriber to the services of a particular network application is known, a client application can determine the SLOT # of that network application's entry in the routing table by calling the GETLIBINX( ) procedure with the TYPE parameter set to "2," and the NAME parameter containing the subscriber number. As shown in the pseudo-code listing, when this is the case, the GETLIBINX( ) procedure first segregates the subscriber number passed as the input NAME into its MAILBOX NUMBER and NUMBERING PLAN subcomponents. The GETLIBINX( ) procedure then accesses the NAP ASDB 66 with the MAILBOX NUMBER and NUMBERING PLAN to obtain the name associated with the network application that provides services to the specified subscriber. Using the name returned from the ASDB, the GETLIBINX( ) procedure first searches the APPNAME column of the routing table 94 for an entry that matches the ASDB name. If a match is found, the procedure returns the SLOT # of the routing table entry containing that name. If no match is found, the procedure then searches the CALLFLOW_PROVNAME column of the routing table 94 for an entry that matches the ASDB name. If a match is found, the procedure returns the SLOT # of the routing table entry containing that name. If no match is found in either column, then the procedure returns an error and records an entry in the system log indicating that no match was found for the specified subscriber number.

If a valid SLOT # for a selected network application is returned, the client application can then initiate a call to a particular call flow of the network application using the CLIENTCL.CALLFLOW_INTERFACE( ) procedure in the CLIENTCL connection library of the call flow library 54. The SLOT # of the selected network application is passed to the CLIENTCL.CALLFLOW_INTERFACE( ) procedure in a HEADER input parameter of that procedure. A PARAM input parameter of the CLIENTCL.CALLFLOW_INTERFACE( ) procedure is used to pass initialization information to the call flow to be executed.

The HEADER input parameter of the CLIENTCL.CALLFLOW_INTERFACE( ) procedure contains the following fields:

| FIELD NAME | DESCRIPTION |
| --- | --- |
| Wait for Reply | 0 Don't Wait<br>1 Wait |
| Result | Result returned by call flow |
| Call Flow Identifier | simulated result of INCMG call state to cause control to pass to selected call flow |
| PARAM length | length of PARAM field |
| SLOT # | SLOT # returned by GETLIBINX( ) procedure; used to obtain connection index of selected network application |

The Wait for Reply field is used to specify whether or not the client application will wait for a result to be passed back from the network application when the call flow has been executed (or terminated for some reason). The Result field is used to return a result back to the client application upon completion of the call flow. The Call Flow Identifier is used to identify the call flow by its call flow identifier name. The PARAM length field specifies the length of the data passed in the PARAM parameter of the procedure. The SLOT # field contains the value returned by the GETLIBINX( ) procedure, which is the SLOT # of the routing table entry for the selected network application.

The PARAM parameter of the CLIENTCL.CALLFLOW_INTERFACE( ) procedure is used to provide initialization data for the selected call flow. As described hereinafter, the agent 36 allocates a state area in memory to handle certain data during execution of the selected call flow. The data passed to the agent in the PARAM parameter is copied into the allocated state area to initialize the call flow execution.

The following pseudo-code listing provides further details of the
CLIENTCL.CALLFLOW_INTERFACE( ) procedure:
CLIENTCL.CALLFLOW_INTERFACE(HEADER, PARAM)
obtain routing table SLOT # from HEADER input parameter;
use SLOT # to obtain STATUS of selected network application from routing table;
if STATUS not AVAILABLE then:
　place entry in system log indicating that the selected network application is currently not available;
　return error—indicating application not available;
else
　use SLOT # to obtain connection index associated with link between network application and private instance of PROVIDERCL connection library of call flow library;
　call AGENTCL.CALLFLOW_INTERFACE(HEADER, PARAM) procedure in AGENTCL connection library of network application agent identified by connection index;
END of procedure CLIENTCL.CALLFLOW_INTERFACE.

As the pseudo-code listing describes, the CLIENTCL.CALLFLOW_INTERFACE( ) procedure first uses the SLOT # in the SLOT # field of the HEADER parameter to access the STATUS field of the routing table entry for the selected network application. If the STATUS field of the routing table entry indicates that the selected network application is not AVAILABLE, then the procedure returns an error and enters the error in the system log. If, on the other hand, the network application is installed and running (i.e., STATUS=AVAILABLE), then the connection index that identifies the linkage between the network application and the call flow library 54 is obtained from the CONNINDEX field of the routing table entry. The CLIENTCL.CALLFLOW_INTERFACE( ) procedure then calls, via the linkage identified by the obtained connection index, the AGENTCL.CALLFLOW_INTERFACE( ) procedure exported by the AGENTCL connection library of the selected network application. The HEADER and PARAM parameters of the CLIENTCL.CALLFLOW_INTERFACE( ) procedure are passed to the network application as the HEADER and PARAM parameters of the AGENTCL.CALLFLOW_INTERFACE( ) procedure. The actual procedure call has the following syntax:

AGENTCL(CONNINDEX).CALLFLOW_INTERFACE(HEADER,PARAM) where AGENTCL (CONNINDEX) is the manner in which the link to the AGENTCL connection library of the selected network application is identified, and CALLFLOW_INTERFACE (HEADER, PARAM) is the call to the procedure within that connection library. Before describing AGENTCL.CALLFLOW_INTERFACE( ) procedure in greater detail, it is helpful to describe additional details of the runtime environment of a network application, particularly the agent 36.

Figure 5:
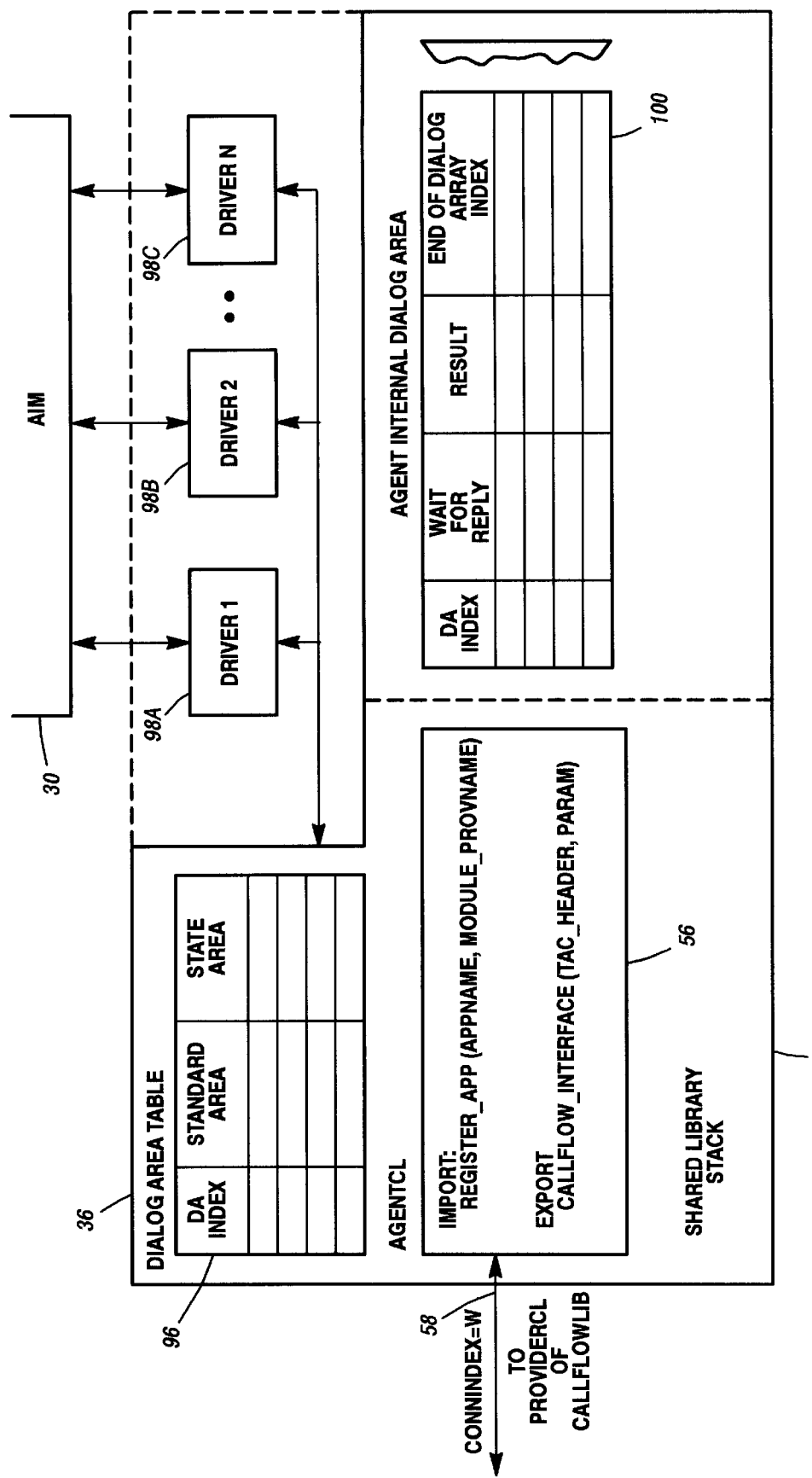
FIG. 5 is a block diagram illustrating further details of the runtime environment of a network application, as well as further details of the preferred embodiment of the methods and apparatus of the present invention.

FIG. 5 is a block diagram illustrating further details of the runtime environment of a network application, particularly the agent 36. The agent 36 comprises a shared library stack 95 that includes the AGENTCL connection library 56 and a Dialog Area Table 36. As described above, the AGENTCL connection library 56 provides the agent-side functionality of the call flow library 54 of the present invention. It imports the REGISTER_APP( ) procedure from its private instance of the PROVIDERCL connection library 92, and exports the AGENTCL.CALLFLOW_INTERFACE( ) procedure (described hereinafter in greater detail) to that instance of the PROVIDERCL connection library 92. The Dialog Area Table 36 is used to maintain state information and other data specific to each dialog (i.e., call) being processed. The agent 36 also has an Internal Dialog Area 100 which is used to store and access certain internal information related to each active dialog.

The agent 36 is capable of processing multiple dialogs simultaneously using multiple instances 98A, 98B, 98C of a Driver (e.g., Driver 1, Driver 2 . . . Driver N). Each Driver 98A, 98B, 98C functions as a call flow interpreter in order to process incoming calls in accordance with the call flows of the network application. During typical execution of a network application, an incoming call will be received from the telephone network 34 by the NAP 28. The NAP 28 processes the call, determines its call type and the network application that is installed to process the call, and then will select, through the AIM 30, an available one of the Drivers 98A, 98B, 98C to handle processing of the call in accordance with the call flows of the network application. Handling of a given call by one of the Drivers 98A, 98B, 98C is called a dialog. The agent 36 assigns a unique index ("DA index") to each new dialog and establishes an entry in both the Dialog Area Table 96 and the agent's Internal Dialog Area 100 for the dialog. The DA index serves as the pointer into the appropriate entries of each table 96, 100.

An entry in the Dialog Area Table 96 for a given dialog includes both a Standard Area and a State Area. The Standard Area provides global data for the core and custom functions used by the network application. Core functions use specific Standard Area fields for input and output. Custom functions can also access any Standard Area field for input and output. The State Area contains user-defined application-specific fields for custom functions. Custom functions use the State Area to store data that other custom functions can use later in the call flow. A custom function can be written to copy information from the State Area into the Standard Area for use by core functions. For a given application, the size of the State Area is provided during application initialization.

For each active dialog, the Internal Dialog Area 100 of the Agent 36 contains a number of fields, three of which are particularly relevant to the present invention. A Wait-For-Reply field is used to indicate whether a client application is waiting for a reply from the network application. A Result field contains the result of the last function executed by the network application during the dialog, i.e., the result of the last call state. An end-of-dialog event index field provides an index into an end-of-dialog event array that is used to signal termination of a dialog.

According to the present invention, when the AGENTCL.CALLFLOW_INTERFACE( ) procedure of the AGENTCL connection library 56 is called by a client application, the AGENTCL.CALLFLOW_INTERFACE( ) procedure establishes a new NAP dialog using an available one of the Drivers 98A, 98B, 98C. Essentially, this process simulates the manner in which the NAP 28 would typically establish a new dialog via the AIM 30. The following pseudo-code listing provides further details of the AGENTCL.CALLFLOW_INTERFACE( ) procedure:

AGENTCL.CALLFLOW_INTERFACE (HEADER, PARAM)
allocate an index number (DA index) in the Dialog Area Table 96;
initialize Agent's Internal Dialog Area 100 at the same DA index;
using PARAM Length field of input HEADER, determine if Dialog Area Table row size is large enough to store input PARAM; if row size too small then:
resize selected row of Dialog Area Table 96;
copy input PARAM into Dialog Area Table at DA index;
copy call flow identifier from input HEADER to Result field of Agent's Internal Dialog Area 100;
copy Wait-For-Reply indicator from input HEADER to corresponding Wait-For-Reply field in Agent's Internal Dialog Area 100;
if waiting for a reply then:
    allocate an end-of-dialog event within the end-of-dialog event array by returning an end-of-dialog event array index;
    store the end-of-dialog array index into field of Agent's Internal Dialog Area 100;
perform select stack routine to select an Agent Driver (call flow interpreter) to initiate execution of the call flow;
if driver stack is not available then:
    queue the CALLFLOW_INTERFACE( ) call in a FIFO queue structure;
once a stack is selected then cause event to wake up Agent Driver so call flow execution can begin;
if waiting for a reply then:
    wait until end of dialog event is caused (call flow terminates dialog);
copy over input PARAM with state area at termination of call flow;
reset event for end-of-dialog;
copy current call flow Result into Result field of HEADER;
END of routine CALLPLOW_INTERFACE.

As the foregoing pseudo-code listing describes, when the CALLFLOW_INTERFACE( ) procedure is called by a client application to initiate execution of a call flow module, the procedure first allocates an available dialog index (DA index) for the requested dialog, and assigns an entry (i.e., row) in the Dialog Area Table 96 and an entry in the Agent Internal Dialog Area 100 at that DA index. As explained above, the HEADER input parameter contains a Wait-for-Reply indicator that determines whether the client application is waiting for a result to be returned upon completion of the selected call flow, a Call Flow Identifier field containing the call flow identifier for the selected call flow, and a PARAM length value that specifies the size of the PARAM input parameter.

After establishing the Dialog Area Table and Internal Dialog Area entries, the procedure next compares the row size of the Dialog Area Table at that DA index to the PARAM length value in the input HEADER. If the row size is too small to accommodate the input PARAM, then the allocated row of the Dialog Area Table is resized. The procedure then copies the input PARAM information into the State Area field of the Dialog Area Table at the DA index. As mentioned above, the PARAM input parameter is used to pass initialization data to the call flow. For example, if a client application was making an external call to the automated reminder call flow of the exemplary network application of FIG. 3 (call flow identifier=REMNDR), the PARAM parameter might contain the telephone number to be used in the DIAL OUT function of call state 82, and might also contain dynamic data, such as the amount of a delinquent payment, the due date of the payment, and the customer's account balance, to be used in the Play Prompt function of call state 84. A custom function can be written to copy PARAM information from the State Area into the Standard Area for use by core functions.

Next, the call flow identifier in the input HEADER is copied into the Result field of the Agent's Internal Dialog Area 100 at DA index. This has the effect of forcing the call flow identifier value to be the result of the INCMG call state of the network application, thus ensuring that the selected call flow will be executed. For example, if a client application wanted to execute the exemplary automated wake-up call flow of the exemplary network application of FIG. 3, the value "WAKEUP" would have been passed to the network application in the call flow identifier field of the input HEADER, and that value would have then been stored in the Result field of the Agent's Internal Dialog Area at the appropriate DA index.

Next, the procedure then copies the Wait-for-Reply indicator in the input HEADER into the corresponding field of the Agent's Internal Dialog Area 100. If the Wait-for-Reply indicator indicates that the client application is waiting for a reply, then the procedure allocates a location in an end-of-dialog event array and returns the index for that array location. The end-of-dialog event array index is then stored in the end-of-dialog event array index field of the Agent's Internal Dialog Area 100. The allocated array location is used to provide an alert that an end-of-dialog event has occurred.

Next, the AGENTCL.CALLFLOW_INTERFACE( ) procedure performs a select stack routine in an attempt to allocate an agent Driver (e.g., one of Drivers 98A, 98B, 98C) to handle execution of the selected call flow for the new dialog. If no Driver is available, then the procedure places the present procedure call into a FIFO queue. When a Driver becomes available, the allocated Driver "wakes-up" and begins processing of the selected call flow at the next call state following the INCMG call state (that next call state being the one identified by the call flow identifier that was stored in the Result field of the Agent's Internal Dialog Area).

If the Wait-for-Reply indicator is true, then the procedure waits until an end of dialog event is detected in the end-of-dialog event array at the location specified in the end-of-dialog event array index field of the Agent's Internal Dialog Area 100. Such an event will occur when the call flow terminates with the Terminate Dialog function. When the end-of-dialog event is detected, the AGENTCL.CALLFLOW_INTERFACE( ) procedure copies over the input PARAM with the State Area of the Dialog Area Table 96 at the row identified by DA index. This is one method for passing information back to the client application. Additionally, the procedure copies the current value in the Result field of the Agent's Internal Dialog Area 100 at the current DA index into the Result field of the input HEADER, thus passing the result of the last call state in the call flow back to the client application. This completes the process.

As the foregoing illustrates, the present invention is directed to methods and apparatus for providing external program access to the executable call flows of a network application. The present invention provides an interface between one or more network applications and a client application to enable the client application to externally call and initiate execution of a selected call flow of one of the network applications. It is understood that changes may be made to the embodiments described above without departing from the broad inventive concepts thereof. In particular, while the invention is described above as embodied in a computer system that employs the UNISYS NAP system to execute network applications, the present invention is by no means limited thereto. Rather, the present invention can be employed in any computer system that has the capability of executing network applications comprising one or more call flows. Additionally, while in the preferred embodiment the functionality of the call flow library of the present invention is implemented using the connection library features of the UNISYS MCP operating system, the present invention is by no means limited to such implementation details. The call flow library of the present invention can be implemented using similar features of other operating systems. Accordingly, the present invention is not limited to the particular embodiments disclosed, but is intended to cover all modifications that are within the spirit and scope of the invention as defined by the appended claims.

What is claimed is:

1. A computer system that has an interface to a telephone network and that is capable of executing network applications that provide telephony services to callers who access the computer system via the telephone network, said network applications each comprising one or more executable call flows, said computer system comprising:

a call flow library to which client applications, including client applications that do not comprise any call flows, and said network applications can be programmatically linked to enable any such client application to call and initiate execution of a selected call flow of any such network application, the call flow library comprising:

a data structure containing information describing the links between said call flow library and each of said network applications that is linked thereto; and program code callable by a client application that, based at least in part on the information contained in said data structure, enables said client application to initiate execution of a selected call flow of a selected network application linked to the call flow library.

2. The computer system of claim 1, wherein a connection index is associated with the link between the call flow library and each network application, and further wherein said data structure comprises a routing table containing an entry for each network application linked to said call flow library that specifies the connection index associated with the link between said call flow library and that network application, and wherein said program code comprises:

first program code callable by a client application and containing instructions that cause the computer system to access the routing table and to return to the client application an indication of the connection index associated with the link between the call flow library and a selected network application; and second program code callable by the client application and containing instructions for causing the computer system to initiate, via the link identified by the connection index indicated by said first program code, execution of a selected call flow of the selected network application.

3. The computer system recited in claim 2, wherein said second program code further causes said computer system to pass to the selected network application, an identifier of the selected call flow and initialization parameter needed for execution of the selected call flow.

4. The computer system recited in claim 2, wherein said call flow library further comprises third program code callable by a network application upon installation of that network application on the computer system, the third program code containing instructions that cause the computer system to establish the link between the network application and the call flow library and to store in the routing table the connection index associated with that link and at least one name that identifies the network application.

5. The computer system recited in claim 2 wherein each network application has a name associated therewith, and wherein the application name of each linked network application is also stored in the routing table entry for that network application, and further wherein the first program code accesses the routing table using the application name to obtain said indication of the connection index.

6. The computer system recited in claim 2 wherein said indication of the connection index comprises a SLOT # that serves as an index into the routing table for the entry of a given network application.

7. A computer-readable medium having program code stored thereon for use in a computer system that has an interface to a telephone network and that executes network applications that provide telephony services to callers who access the computer system via the telephone network, each network application comprising one or more call flows, said program code implementing a call flow library to which client applications, including client applications that do not comprise any call flows, and said network applications can be programmatically linked to enable any such client application to externally call and initiate execution of a selected call flow of any such network application, the call flow library comprising:

a data structure containing information describing the links between said call flow library and each of said network applications that is linked thereto; and program code callable by a client application that, based at least in part on the information contained in said data structure, enables said client application to initiate execution of a selected call flow of a selected network application linked to the call flow library.

8. The computer-readable medium recited in claim 8 wherein said data structure comprises a routing table containing an entry for each network application linked to said call flow library that specifies a connection index associated with the link between said call flow library and that network application, and wherein said program code comprises:

first program code callable by a client application and containing instructions that cause the computer system to access the routing table and to return to the client application an indication of the connection index associated with the link between the call flow library and a selected network application; and second program code callable by the client application and containing instructions for causing the computer system to initiate, via the link identified by the connection index indicated by said first program code, execution of a selected call flow of the selected network application.

9. The computer-readable medium recited in claim 8, wherein said second program code further causes said computer system to pass to the selected network application, an identifier of the selected call flow and initialization parameters needed for execution of the selected call flow.

10. The computer-readable medium recited in claim 8, wherein said call flow library further comprises third program code callable by a network application upon installation of that network application on the computer system, the third program code containing instructions that cause the computer system to establish the link between the network application and the call flow library and to store in the routing table the connection index associated with that link.

11. The computer-readable medium recited in claim 8 wherein each network application has a name associated therewith, and wherein the application name of each linked network application is also stored in the routing table entry for that network application, and further wherein the first program code accesses the routing table using the application name to obtain said indication of the connection index.

12. The computer-readable medium recited in claim 8 wherein said indication of the connection index comprises a SLOT # that serves as an index into the routing table for the entry of a given network application.

13. In a computer system that has an interface to a telephone network and that executes network applications that provide telephony services to callers who access the computer system via the telephone network, each network application comprising one or more call flows, a call flow library to which client applications, including client applications that do not comprise any call flows, and said network applications can be programmatically linked to enable any such client application to externally call and initiate execution of a selected call flow of any such network application, said call flow library comprising:

a routing table containing an entry for each network application programmatically linked to said call flow library that specifies a connection index associated with the link between that network application and said call flow library;

first program code callable by a client application and containing instructions that cause the computer system to access the routing table and to return to the client application an indication of the connection index associated with the link between the call flow library and a selected network application; and second program code callable by the client application and containing instructions for causing the computer system to initiate, via the link identified by the connection index indicated by said first, execution of the selected call flow of the selected network application.

14. The call flow library recited in claim 13, wherein said second program code further causes said computer system to pass to the selected network application, an identifier of the selected call flow and initialization parameters needed for execution of the selected call flow.

15. The call flow library recited in claim 13, wherein said call flow library further comprises third program code callable by a network application upon installation of that network application on the computer system, the third program code containing instructions that cause the computer system to establish the link between the network application and the call flow library and to store in the routing table the connection index associated with that link.

16. The call flow library recited in claim 13 wherein each network application has a name associated therewith, and wherein the application name of each linked network application is also stored in the routing table entry for that network application, and further wherein the first program code accesses the routing table using the application name to obtain said indication of the connection index.

* * * * *